United States Patent
Kwon et al.

(10) Patent No.: US 10,408,308 B2
(45) Date of Patent: Sep. 10, 2019

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Hyun Sik Kwon, Seoul (KR); Seong Wook Hwang, Gunpo-si (KR); Ki Tae Kim, Incheon (KR); Wonmin Cho, Hwaseong-si (KR); Jae Chang Kook, Hwaseong-si (KR); Seongwook Ji, Gunpo-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 140 days.

(21) Appl. No.: 15/833,846

(22) Filed: Dec. 6, 2017

(65) Prior Publication Data
US 2019/0120340 A1 Apr. 25, 2019

(30) Foreign Application Priority Data
Oct. 19, 2017 (KR) .................. 10-2017-0135812

(51) Int. Cl.
 *F16H 3/66* (2006.01)
(52) U.S. Cl.
 CPC ....... *F16H 3/66* (2013.01); *F16H 2200/0069* (2013.01); *F16H 2200/2012* (2013.01); *F16H 2200/2046* (2013.01)

(58) Field of Classification Search
 CPC ....................................................... F16H 3/66
 See application file for complete search history.

(56) References Cited

U.S. PATENT DOCUMENTS

2019/0120339 A1* 4/2019 Kook .................. F16H 3/66
2019/0170218 A1* 6/2019 Ji ........................ F16H 3/66

* cited by examiner

*Primary Examiner* — Derek D Knight
(74) *Attorney, Agent, or Firm* — Morgan, Lewis & Bockius LLP

(57) ABSTRACT

A planetary gear train may include: an input shaft an output shaft; first to fourth planetary gear sets including first to twelfth rotation elements; a first shaft fixedly connected to the second rotation element and the input shaft; a second shaft fixedly connected to the ninth and tenth rotation elements, and selectively connectable to the input shaft; a third shaft fixedly connected to the eleventh rotation element and the output shaft; a fourth shaft fixedly connected to the third rotation element; a fifth shaft fixedly connected to the fifth rotation element, the eighth rotation element, and the twelfth rotation element; a sixth shaft fixedly connected to the seventh rotation element; and a plurality of shafts formed by combinations of remaining rotation elements of the first and second planetary gear sets that are not connected to the first to sixth shafts, and selectively and respectively connected to a transmission housing.

11 Claims, 2 Drawing Sheets

FIG. 2

| Speed stages | Engaging elements | | | | | | Gear ratio |
|---|---|---|---|---|---|---|---|
| | C1 | C2 | C3 | C4 | B1 | B2 | |
| D1 |  | ● |  | ● |  | ● | 4.191 |
| D2 |  |  | ● | ● |  | ● | 2.704 |
| D3 |  | ● | ● |  |  | ● | 1.845 |
| D4 | ● |  | ● |  |  | ● | 1.453 |
| D5 | ● | ● |  |  |  | ● | 1.251 |
| D6 | ● | ● | ● |  |  |  | 1.000 |
| D7 | ● | ● |  |  | ● |  | 0.835 |
| D8 | ● |  | ● |  | ● |  | 0.638 |
| D9 |  | ● | ● |  | ● |  | 0.545 |
| D10 |  |  | ● | ● | ● |  | 0.466 |
| REV |  | ● |  |  | ● | ● | -3.195 |

PLANETARY GEAR TRAIN OF AUTOMATIC TRANSMISSION FOR VEHICLE

CROSS-PREDETERMINED TO RELATED APPLICATION

The present application claims priority to Korean Patent Application No. 10-2017-0135812 filed on Oct. 19, 2017, the entire contents of which is incorporated herein for all purposes by this reference.

BACKGROUND OF THE INVENTION

Field of the Invention

The present invention relates to an automatic transmission for a vehicle. More, the present invention relates to a planetary gear train of an automatic transmission for a vehicle that improves power delivery performance and fuel economy by achieving at least ten forward speeds and widening speed ratio span (or gear ratio span), and secures linearity of step ratios.

Description of Related Art

Generally, an automatic transmission achieving more speed stages has been developed to enhancing fuel economy and optimizing drivability.

Such an automatic transmission achieving more speed stages is necessary to maximize power performance and driving efficiency according to downsizing of an engine, it is desperately demanded to develop high efficiency multiple-speeds transmissions having excellent linearity of step ratios that can be used as an index closely related to drivability such as acceleration before and after shift and rhythmical engine speed to secure competitiveness of automatic transmission field.

However, in the automatic transmission, as the number of speed stages increase, the number of internal components increase, and as a result, mountability, cost, weight, transmission efficiency, and the like may still deteriorate.

Accordingly, development of a planetary gear train which may achieve maximum efficiency with a small number of components may be important to increase a fuel efficiency enhancement effect through the multiple-speeds.

In this background, an eight-speed automatic transmission has been introduced recently and a planetary gear train for an automatic transmission facilitating more shift-stages is under investigation.

However, since a conventional eight-speed automatic transmission has gear ratio span of 6.5-7.5 (gear ratio span is an important factor for securing linearity of step ratios), improvement of power performance and fuel economy may not be great.

In addition, if an eight-speed automatic transmission has gear ratio span greater than 9.0, it is hard to secure linearity of step ratios. Therefore, driving efficiency of an engine and drivability of a vehicle may be deteriorated, and thus, development of high efficiency automatic transmissions which achieve at least nine forward speeds is necessary.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing planetary gear train of an automatic transmission for a vehicle having advantages of improving power delivery performance and fuel economy and securing linearity of step ratios by achieving ten forward speeds and one reverse speed but increasing a gear ratio span with a minimum number of constituent elements being used.

A planetary gear train of an automatic transmission for a vehicle according to an exemplary embodiment of the present invention may include: an input shaft receiving torque of an engine; an output shaft outputting torque; a first planetary gear set including first, second and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft fixedly connected to the second rotation element and the input shaft; a second shaft fixedly connected to the ninth rotation element and the tenth rotation element, and selectively connectable to the input shaft; a third shaft fixedly connected to the eleventh rotation element and the output shaft; a fourth shaft fixedly connected to the third rotation element; a fifth shaft fixedly connected to the fifth rotation element, the eighth rotation element, and the twelfth rotation element; a sixth shaft fixedly connected to the seventh rotation element; and a plurality of shafts formed by combinations of remaining rotation elements of the first and second planetary gear sets that are not connected to the first to sixth shafts, and selectively and respectively connected to a transmission housing.

The plurality of shafts may include: a seventh shaft fixedly connected to the first rotation element and the fourth rotation element, and selectively connectable to the transmission housing; and an eighth shaft fixedly connected to the sixth rotation element and selectively connectable to the transmission housing. The input shaft and the second shaft, the fourth shaft and the sixth shaft, the fourth shaft and the fifth shaft, and the sixth shaft and the seventh shaft may be selectively and respectively connected to each other.

The planetary gear train may further include: four clutches, each selectively connecting any two shafts including the input shaft; and two brakes, each selectively connecting each of the seventh shaft and the eighth shaft to the transmission housing.

The four clutches may include: a first clutch disposed between the input shaft and the second shaft; a second clutch disposed between the fourth shaft and the sixth shaft; a third clutch disposed between the fourth shaft and the fifth shaft; and a fourth clutch disposed between the sixth shaft and the seventh shaft. The two brakes may include: a first brake disposed between the seventh shaft and the transmission housing; and a second brake disposed between the eighth shaft and the transmission housing.

The first rotation element is a first sun gear, the second rotation element is a first planet carrier, and the third rotation element is a first ring gear. The fourth rotation element is a second sun gear, the fifth rotation element is a second planet carrier, and the sixth rotation element is a second ring gear. The seventh rotation element is a third sun gear, the eighth rotation element is a third planet carrier, and the ninth rotation element is a third ring gear. The tenth rotation element is a fourth sun gear, the eleventh rotation element is a fourth planet carrier, and the twelfth rotation element is a fourth ring gear.

The first, second, third and fourth planetary gear sets may be disposed in a sequence of the second, first, third, and fourth planetary gear sets from an engine side thereof.

The planetary gear train according to the exemplary embodiments of the present invention may achieve ten forward speeds and one reverse speed by combining four planetary gear sets being simple planetary gear sets with six engaging elements.

Furthermore, since linearity of step ratios can be secured due to multiple speed stages, drivability including acceleration before and after shift, rhythmical engine speed, and the like may be improved.

The methods and apparatuses of the present invention have other features and advantages which will be apparent from or are set forth in more detail in the accompanying drawings, which are incorporated herein, and the following Detailed Description, which in combination serve to explain certain principles of the present invention.

BRIEF DESCRIPTION OF THE DRAWINGS

FIG. 2 is an operation chart of engaging elements at each speed stage in the planetary gear train according to an exemplary embodiment of the present invention.

Figure 1:
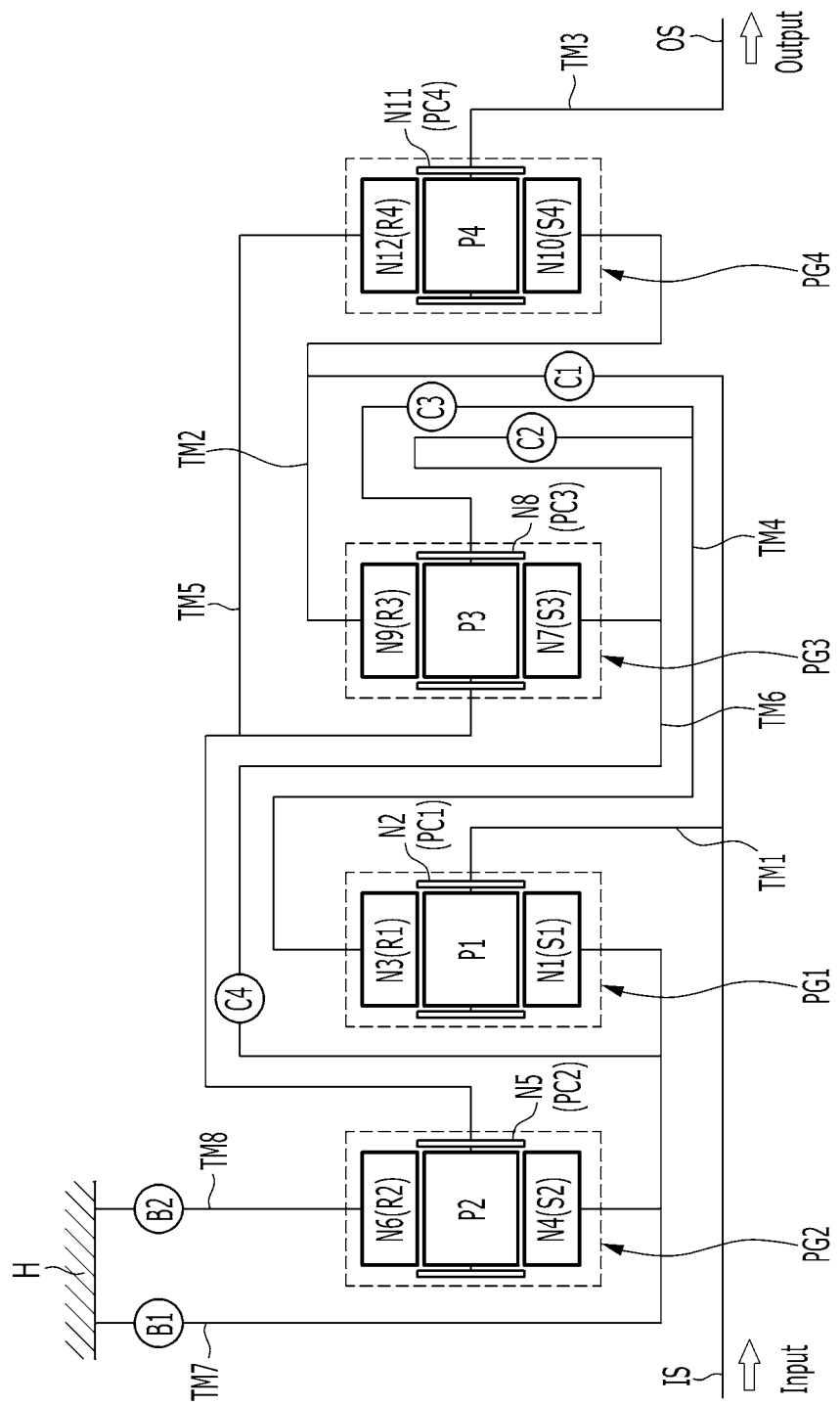
FIG. 1 is a schematic diagram of a planetary gear train according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the intended application and use environment.

In the figures, predetermined numbers refer to the same or equivalent parts of the present invention throughout the several figures of the drawing.

DETAILED DESCRIPTION

Predetermined will now be made more specifically to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but various alternatives, modifications, equivalents and other embodiments, which may be included within the spirit and scope of the invention as defined by the appended claims.

Hereinafter, exemplary embodiments of the present invention will be described more specifically with reference to the accompanying drawings.

However, parts which are not related with the description are omitted for clearly describing the exemplary embodiments of the present invention and like reference numerals refer to like or similar elements throughout the specification.

In the following description, dividing names of components into first, second, and the liketo is configured to divide the names because the names of the components are the same as each other and an order thereof is not particularily limited.

FIG. 1 is a schematic diagram of a planetary gear train according to an exemplary embodiment of the present invention.

Referring to FIG. 1, a planetary gear train according to the exemplary embodiment of the present invention includes first, second, third and fourth planetary gear sets PG1, PG2, PG3, and PG4 disposed on the same axis, an input shaft IS, an output shaft OS, eight shafts TM1 to TM8 connected to at least one rotation element of the first, second, third and fourth planetary gear sets PG1, PG2, PG3, and PG4, engaging elements including four clutches C1 to C4 and two brakes B1 and B2, and a transmission housing H.

Torque input from an engine to the input shaft IS is changed by cooperation of the first, second, third and fourth planetary gear sets PG1, PG2, PG3, and PG4, and the changed torque is output through the output shaft OS.

According to the exemplary embodiment of the present invention, the planetary gear sets are disposed in a sequence of the second, first, third, and fourth planetary gear sets PG2, PG1, PG3, and PG4 from an engine side thereof.

The input shaft IS is an input member and a torque from a crankshaft of the engine is torque-converted through a torque converter to be input into the input shaft IS.

The output shaft OS is an output element, is disposed in parallel with the input shaft IS, and transmits driving torque to a driving wheel through a differential apparatus.

The first planetary gear set PG1 is a single pinion planetary gear set and includes a first sun gear S1 of a first rotation element N1, a first planet carrier PC1 of a second rotation element N2 rotatably supporting a plurality of first pinion gears P1 engaged with the first sun gear S1, and a first ring gear R1 of a third rotation element N3 engaged with the plurality of first pinion gears P1 and operably connected to the first sun gear S1.

The second planetary gear set PG2 is a single pinion planetary gear set and includes a second sun gear S2 of a fourth rotation element N4, a second planet carrier PC2 of a fifth rotation element N5 rotatably supporting a plurality of second pinion gears P2 evenly disposed on and externally engaged with an external circumference the second sun gear S2, and a second ring gear R2 of a sixth rotation element N6 internally engaged with the plurality of second pinion gears P2 and operably connected to the second sun gear S2.

The third planetary gear set PG3 is a single pinion planetary gear set and includes a third sun gear S3 of a seventh rotation element N7, a third planet carrier PC3 of an eighth rotation element N8 rotatably supporting a plurality of third pinion gears P3 evenly disposed on and externally engaged with an external circumference the third sun gear S3, and a third ring gear R3 of a ninth rotation element N9 internally engaged with the plurality of third pinion gears P3 and operably connected to the third sun gear S3.

The fourth planetary gear set PG4 is a single pinion planetary gear set and includes a fourth sun gear S4 of a tenth rotation element N10, a fourth planet carrier PC4 of an eleventh rotation element N11 rotatably supporting a plurality of fourth pinion gears P4 evenly disposed on and externally engaged with an external circumference the fourth sun gear S4, and a fourth ring gear R4 of a twelfth rotation element N12 internally engaged with the plurality of fourth pinion gears P4 and operably connected to the fourth sun gear S4.

The first rotation element N1 is fixedly connected to the fourth rotation element N4, the fifth rotation element N5 is fixedly connected to the eighth rotation element N8 and the twelfth rotation element N12, and the ninth rotation element N9 is fixedly connected to the tenth rotation element N10 such that the first, second, third and fourth planetary gear sets PG1, PG2, PG3, and PG4 include eight shafts TM1 to TM8.

The eight shafts TM1 to TM8 will be described in further detail.

The first shaft TM1 is fixedly connected to the second rotation element N2 (first planet carrier PC1) and is fixedly connected to the input shaft IS is to be continuously operated as an input element.

The second shaft TM2 is fixedly connected to the ninth rotation element N9 (third ring gear R3) and the tenth rotation element N10 (fourth sun gear S4), and is selectively connectable to the input shaft IS is to be operated as a selective input element.

The third shaft TM3 is fixedly connected to the eleventh rotation element N11 (fourth planet carrier PC4) and is fixedly connected to the output shaft OS to be continuously operated as an output element.

The fourth shaft TM4 is fixedly connected to the third rotation element N3 (first ring gear).

The fifth shaft TM5 is fixedly connected to the fifth rotation element N5 (second planet carrier PC2), the eighth rotation element N8 (third planet carrier PC3), and the twelfth rotation element N12 (fourth ring gear R4).

The sixth shaft TM6 is fixedly connected to the seventh rotation element N7 (third sun gear S3).

The seventh shaft TM7 is fixedly connected to the first rotation element N1 (first sun gear S1) and the fourth rotation element N4 (second sun gear S2).

The eighth shaft TM8 is fixedly connected to the sixth rotation element N6 (second ring gear R2).

The eight shafts TM1 to TM8 fixedly connects a plurality of rotation elements among the rotation elements of the planetary gear sets PG1, PG2, PG3, and PG4 with each other, are rotation members that are connected to any one rotation element and rotate with the any one rotation element to transmit torque, are rotation members that selectively connects any one rotation element with the transmission housing H, or are fixing members that fixedly connect any one rotation element to the transmission housing H.

Here, the term "fixedly connected" or the like device at least two members are connected to each other to always rotate without rotation speed difference. That is, at least two members that are fixedly connected to each other always rotate with the same rotation speed and in the same rotation direction thereof.

Here, the term "selectively connectable" or the like device a plurality of shafts including the input shaft and the output shaft are connectable to each other through at least one of the engaging elements to rotate with the same rotation speed and in the same rotation direction, or are connectable to the transmission housing through at least one of the engaging elements to be fixed to the transmission housing.

In other words, in a case that the engaging element selectively connects a plurality of shafts to each other, the plurality of shafts rotate with the same rotation speed and in the same rotation direction when the engaging element operates but the plurality of shafts are disconnected from each other when the engaging element is released.

Furthermore, in a case that the engaging element selectively connects any one shaft to the transmission housing, the corresponding shaft is fixedly connected to the transmission housing when the engaging element operates but the corresponding shaft is rotatable when the engaging element is released.

The input shaft IS is selectively connectable to the second shaft TM2, the fourth shaft TM4 is selectively connectable to each of the fifth shaft TM5 and the sixth shaft TM6, and the sixth shaft TM6 is selectively connectable to the seventh shaft TM7.

Furthermore, each of the seventh shaft TM7 and the eighth shaft TM8 is selectively connectable to the transmission housing H to be operated as a selective fixed element.

Four clutches C1, C2, C3, and C4 that are engaging elements are disposed at portions at which any two shafts among the eight shafts TM1 to TM8 including the input shaft IS and the output shaft OS are selectively connectable to each other.

Furthermore, two brakes B1 and B2 that are engaging elements are disposed at portions at which any one shaft among the eight shafts TM1 to TM8 is selectively connectable to the transmission housing H.

Arrangement of the four clutches C1 to C4 and two brakes B1 to B2 will be described more specifically.

The first clutch C1 is disposed between the input shaft IS and the second shaft TM2 and selectively connects the input shaft IS to the second shaft TM2.

The second clutch C2 is disposed between the fourth shaft TM4 and the sixth shaft TM6 and selectively connects the fourth shaft TM4 to the sixth shaft TM6.

The third clutch C3 is disposed between the fourth shaft TM4 and the fifth shaft TM5 and selectively connects the fourth shaft TM4 to the fifth shaft TM5.

The fourth clutch C4 is disposed between the sixth shaft TM6 and the seventh shaft TM7 and selectively connects the sixth shaft TM6 to the seventh shaft TM7.

The first brake B1 is disposed between the seventh shaft TM7 and the transmission housing H and selectively connects and fixes the seventh shaft TM7 to the transmission housing H.

The second brake B2 is disposed between the eighth shaft TM8 and the transmission housing H and selectively connects and fixes the eighth shaft TM8 to the transmission housing H.

It is illustrated in FIG. 1 that the first clutch C1 selectively connects the input shaft IS to the second shaft TM2. However, since the input shaft IS is fixedly connected to the first shaft TM1, the first clutch C1 may be configured to selectively connect the first shaft TM1 to the second shaft TM2.

The engaging elements including the first, second, third and fourth clutches C1, C2, C3, and C4 and the first and second brakes B1 and B2 may be multi-plates friction elements of wet type that are operated by hydraulic pressure. Multi-plates friction elements of wet type are mainly used as the engaging elements, but dog clutches, electric clutches, or magnetic clutches that can be operated by electric signal from an electric control device can be used as the engaging elements.

FIG. 2 is an operation chart of engaging elements at each speed stage in the planetary gear train according to the exemplary embodiment of the present invention.

Referring to FIG. 2, three engaging elements among the first, second, third and fourth clutches C1, C2, C3, and C4 and the first and second brakes B1 and B2 are operated at each speed stage in the planetary gear train according to the various exemplary embodiments of the present invention.

The second and fourth clutches C2 and C4 and the second brake B2 are operated at a first forward speed D1.

In a state that the fourth shaft TM4 is connected to the sixth shaft TM6 by operation of the second clutch C2 and the sixth shaft TM6 is connected to the seventh shaft TM5 by operation of the fourth clutch C4, torque of the input shaft IS is input to the first shaft TM1.

At the present state, the eighth shaft TM8 is operated as the fixed element by operation of the second brake B2. Therefore, the torque of the input shaft IS is shifted into the first forward speed, and the first forward speed is output through the output shaft OS connected to the third shaft TM3.

The third and fourth clutches C3 and C4 and the second brake B2 are operated at a second forward speed D2.

In a state that the fourth shaft TM4 is connected to the fifth shaft TM5 by operation of the third clutch C3 and the sixth shaft TM6 is connected to the seventh shaft TM5 by operation of the fourth clutch C4, the torque of the input shaft IS is input to the first shaft TM1.

At the present state, the eighth shaft TM8 is operated as the fixed element by operation of the second brake B2. Therefore, the torque of the input shaft IS is shifted into the second forward speed, and the second forward speed is output through the output shaft OS connected to the third shaft TM3.

The second and third clutches C2 and C3 and the second brake B2 are operated at a third forward speed D3.

In a state that the fourth shaft TM4 is connected to the sixth shaft TM6 by operation of the second clutch C2 and the fourth shaft TM4 is connected to the fifth shaft TM5 by operation of the third clutch C3, the torque of the input shaft IS is input to the first shaft TM1.

At the present state, the eighth shaft TM8 is operated as the fixed element by operation of the second brake B2. Therefore, the torque of the input shaft IS is shifted into the third forward speed, and the third forward speed is output through the output shaft OS connected to the third shaft TM3.

The first and third clutches C1 and C3 and the second brake B2 are operated at a fourth forward speed D4.

In a state that the input shaft IS is connected to the second shaft TM2 by operation of the first clutch C1 and the fourth shaft TM4 is connected to the fifth shaft TM5 by operation of the third clutch C3, the torque of the input shaft IS is input to the first shaft TM1 and the second shaft TM2.

At the present state, the eighth shaft TM8 is operated as the fixed element by operation of the second brake B2. Therefore, the torque of the input shaft IS is shifted into the fourth forward speed, and the fourth forward speed is output through the output shaft OS connected to the third shaft TM3.

The first clutch and second clutch C1 and C2 and the second brake B2 are operated at a fifth forward speed D5.

In a state that the input shaft IS is connected to the second shaft TM2 by operation of the first clutch C1 and the fourth shaft TM4 is connected to the sixth shaft TM6 by operation of the second clutch C2, the torque of the input shaft IS is input to the first shaft TM1 and the second shaft TM2.

At the present state, the eighth shaft TM8 is operated as the fixed element by operation of the second brake B2. Therefore, the torque of the input shaft IS is shifted into the fifth forward speed, and the fifth forward speed is output through the output shaft OS connected to the third shaft TM3.

The first, second and third clutches C1, C2, and C3 are operated at a sixth forward speed D6.

The input shaft IS is connected to the second shaft TM2 by operation of the first clutch C1, the fourth shaft TM4 is connected to the sixth shaft TM6 by operation of the second clutch C2, and the fourth shaft TM4 is connected to the fifth shaft TM5 by operation of the third clutch C3.

In the instant case, the first, second, third and fourth planetary gear sets PG1, PG2, PG3, and PG4 become lock-up states. The torque of the input shaft IS input to the first shaft TM1 and the second shaft TM2 is output through the output shaft OS connected to the third shaft TM3 without rotation speed change.

The first clutch and second clutch C1 and C2 and the first brake B1 are operated at a seventh forward speed D7.

In a state that the input shaft IS is connected to the second shaft TM2 by operation of the first clutch C1 and the fourth shaft TM4 is connected to the sixth shaft TM6 by operation of the second clutch C2, the torque of the input shaft IS is input to the first shaft TM1 and the second shaft TM2.

At the present state, the seventh shaft TM7 is operated as the fixed element by operation of the first brake B1. Therefore, the torque of the input shaft IS is shifted into the seventh forward speed, and the seventh forward speed is output through the output shaft OS connected to the third shaft TM3.

The first and third clutches C1 and C3 and the first brake B1 are operated at an eighth forward speed D8.

In a state that the input shaft IS is connected to the second shaft TM2 by operation of the first clutch C1 and the fourth shaft TM4 is connected to the fifth shaft TM5 by operation of the third clutch C3, the torque of the input shaft IS is input to the first shaft TM1 and the second shaft TM2.

At the present state, the seventh shaft TM7 is operated as the fixed element by operation of the first brake B1. Therefore, the torque of the input shaft IS is shifted into the eighth forward speed, and the eighth forward speed is output through the output shaft OS connected to the third shaft TM3.

The second and third clutches C2 and C3 and the first brake B1 are operated at a ninth forward speed D9.

In a state that the fourth shaft TM4 is connected to the sixth shaft TM6 by operation of the second clutch C2 and the fourth shaft TM4 is connected to the fifth shaft TM5 by operation of the third clutch C3, the torque of the input shaft IS is input to the first shaft TM1.

At the present state, the seventh shaft TM7 is operated as the fixe element by operation of the first brake B1. Therefore, the torque of the input shaft IS is shifted into the ninth forward speed, and the ninth forward speed is output through the output shaft OS connected to the third shaft TM3.

The third and fourth clutches C4 and C4 and the first brake B1 are operated at a tenth forward speed D10.

In a state that the fourth shaft TM4 is connected to the fifth shaft TM5 by operation of the third clutch C3 and the sixth shaft TM6 is connected to the seventh shaft TM5 by operation of the fourth clutch C4, the torque of the input shaft IS is input to the first shaft TM1.

At the present state, the seventh shaft TM7 is operated as the fixed element by operation of the first brake B1. Therefore, the torque of the input shaft IS is shifted into the tenth forward speed, and the tenth forward speed is output through the output shaft OS connected to the third shaft TM3.

The second clutch C2 and the first and second brakes B1 and B2 are operated at a reverse speed REV.

In a state that the fourth shaft TM4 is connected to the sixth shaft TM6 by operation of the second clutch C2, the torque of the input shaft IS is input to the first shaft TM1.

At the present state, the seventh and the eighth shafts TM7 and TM8 are operated as the fixed elements by operation of the first and second brakes B1 and B2. Therefore, the torque of the input shaft IS is shifted into the reverse speed, and the reverse speed is output through the output shaft OS connected to the third shaft TM3.

According to the exemplary embodiment of the present invention, ten forward speeds and one reverse speed may be achieved by use of four planetary gear sets PG1, PG2, PG3, and PG4, four clutches C1, C2, C3, and C4, and two brakes B1 and B2.

Furthermore, since linearity of step ratios can be secured due to multiple speed stages, drivability including acceleration before and after shift, rhythmical engine speed, and the like may be improved.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with predetermined to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train apparatus of an automatic transmission for a vehicle, comprising:
    an input shaft receiving torque of an engine;
    an output shaft outputting torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element;
    a fourth planetary gear set including a tenth rotation element, an eleventh rotation element, and a twelfth rotation element;
    a first shaft fixedly connected to the second rotation element and the input shaft;
    a second shaft fixedly connected to the ninth rotation element and the tenth rotation element, and selectively connectable to the input shaft;
    a third shaft fixedly connected to the eleventh rotation element and the output shaft;
    a fourth shaft fixedly connected to the third rotation element;
    a fifth shaft fixedly connected to the fifth rotation element, the eighth rotation element, and the twelfth rotation element;
    a sixth shaft fixedly connected to the seventh rotation element; and
    a plurality of shafts formed by combinations of remaining rotation elements of the first and second planetary gear sets that are not connected to the first to sixth shafts, and selectively and respectively connected to a transmission housing.

2. The planetary gear train apparatus of claim 1, wherein the plurality of shafts comprise:
    a seventh shaft fixedly connected to the first rotation element and the fourth rotation element, and selectively connectable to the transmission housing; and
    an eighth shaft fixedly connected to the sixth rotation element and selectively connectable to the transmission housing, and
    wherein the input shaft is selectively connectable to the second shaft, the fourth shaft is selectively connectable to the sixth shaft, the fourth shaft is selectively connectable to the fifth shaft, and the sixth shaft is selectively connectable to the seventh shaft.

3. The planetary gear train apparatus of claim 2, further including:
    four clutches, each selectively connecting two shafts of the first to sixth shafts including the input shaft; and
    two brakes, each selectively connecting each of the seventh shaft and the eighth shaft to the transmission housing.

4. The planetary gear train apparatus of claim 3, wherein the four clutches include:
    a first clutch mounted between the input shaft and the second shaft;
    a second clutch mounted between the fourth shaft and the sixth shaft;
    a third clutch mounted between the fourth shaft and the fifth shaft; and
    a fourth clutch mounted between the sixth shaft and the seventh shaft, and the two brakes include:
    a first brake mounted between the seventh shaft and the transmission housing; and
    a second brake mounted between the eighth shaft and the transmission housing.

5. The planetary gear train apparatus of claim 1, wherein the first rotation element is a first sun gear, the second rotation element is a first planet carrier, and the third rotation element is a first ring gear,
    the fourth rotation element is a second sun gear, the fifth rotation element is a second planet carrier, and the sixth rotation element is a second ring gear,
    the seventh rotation element is a third sun gear, the eighth rotation element is a third planet carrier, and the ninth rotation element is a third ring gear, and
    the tenth rotation element is a fourth sun gear, the eleventh rotation element is a fourth planet carrier, and the twelfth rotation element is a fourth ring gear.

6. The planetary gear train apparatus of claim 1, wherein the first, second, third and fourth planetary gear sets are disposed in a sequence of the second, first, third, and fourth planetary gear sets from an engine side thereof.

7. A planetary gear train apparatus of an automatic transmission for a vehicle, comprising:
    an input shaft receiving torque of an engine;
    an output shaft outputting torque;
    a first planetary gear set including a first rotation element, a second rotation element, and a third rotation element;
    a second planetary gear set including a fourth rotation element, a fifth rotation element, and a sixth rotation element;
    a third planetary gear set including a seventh rotation element, an eighth rotation element, and a ninth rotation element; and
    a fourth planetary gear set including a tenth rotation element, an eleventh rotation element, and a twelfth rotation element,
    wherein the second rotation element is fixedly connected to the input shaft, the eleventh rotation element is fixedly connected to the output shaft, the first rotation element is fixedly connected to the fourth rotation element, is selectively connectable to the seventh rotation element, and is selectively connectable to a transmission housing, the fifth rotation element is fixedly connected to the eighth rotation element and the twelfth rotation element and is selectively connectable to the third rotation element, the sixth rotation element is selectively connectable to the transmission housing, the seventh rotation element is selectively connectable to the third rotation element, and the ninth rotation element is fixedly connected to the tenth rotation element and is selectively connectable to the input shaft.

8. The planetary gear train apparatus of claim 7, further including:
   four clutches, each selectively connecting the input shaft to one rotation element of the first, second, third, fourth, fifth, seventh, eighth, ninth, tenth, and twelfth rotation elements, or one rotation element to another rotation element of the first, second, third, fourth, fifth, seventh, eighth, ninth, tenth, and twelfth rotation elements; and
   two brakes, each selectively connecting each of the fourth rotation element and the sixth rotation element to the transmission housing.

9. The planetary gear train apparatus of claim 8, wherein the four clutches include:
   a first clutch mounted between the input shaft and the ninth rotation element;
   a second clutch mounted between the third rotation element and the seventh rotation element;
   a third clutch mounted between the third rotation element and the eighth rotation element; and
   a fourth clutch mounted between the first rotation element and the seventh rotation element, and
   the two brakes include:
   a first brake mounted between the first rotation element and the transmission housing; and
   a second brake mounted between the sixth rotation element and the transmission housing.

10. The planetary gear train apparatus of claim 7, wherein the first rotation element is a first sun gear, the second rotation element is a first planet carrier, and the third rotation element is a first ring gear,
    the fourth rotation element is a second sun gear, the fifth rotation element is a second planet carrier, and the sixth rotation element is a second ring gear,
    the seventh rotation element is a third sun gear, the eighth rotation element is a third planet carrier, and the ninth rotation element is a third ring gear, and
    the tenth rotation element is a fourth sun gear, the eleventh rotation element is a fourth planet carrier, and the twelfth rotation element is a fourth ring gear.

11. The planetary gear train apparatus of claim 7, wherein the first, second, third and fourth planetary gear sets are disposed in a sequence of the second, first, third, and fourth planetary gear sets from an engine side thereof.

* * * * *